(12) United States Patent
Boufnichel (10) Patent No.: US 11,387,517 B2
(45) Date of Patent: Jul. 12, 2022

(54) MICROBATTERY ASSEMBLY

(71) Applicant: STMicroelectronics (Tours) SAS, Tours (FR)

(72) Inventor: Mohamed Boufnichel, Monnaie (FR)

(73) Assignee: STMicroelectronics (Tours) SAS, Tours (FR)

( * ) Notice: Subject to any disclaimer, the term of this patent is extended or adjusted under 35 U.S.C. 154(b) by 312 days.

(21) Appl. No.: 16/255,625

(22) Filed: Jan. 23, 2019

(65) Prior Publication Data

US 2019/0237717 A1     Aug. 1, 2019

(30) Foreign Application Priority Data

Jan. 29, 2018   (FR) ...................................... 1850680

(51) Int. Cl.
| | | |
|---|---|---|
| *H01M 10/00* | (2006.01) | |
| *H01M 50/209* | (2021.01) | |
| *H02J 7/02* | (2016.01) | |
| *H01M 10/46* | (2006.01) | |
| *H01M 10/04* | (2006.01) | |

(Continued)

(52) U.S. Cl.
CPC ..... *H01M 50/209* (2021.01); *H01M 10/0436* (2013.01); *H01M 10/425* (2013.01); *H01M 10/441* (2013.01); *H01M 10/46* (2013.01); *H01M 50/10* (2021.01); *H01M 50/116* (2021.01); *H01M 50/124* (2021.01); *H01M 50/502* (2021.01); *H02J 7/022* (2013.01); *H01M 6/40* (2013.01); *H01M 2010/0495* (2013.01);

(Continued)

(58) Field of Classification Search
CPC .. H01M 50/209; H01M 50/10; H01M 50/116; H01M 50/124; H01M 50/502; H01M 10/0436; H01M 10/425; H01M 10/441; H01M 10/46; H01M 2300/0065; H01M 2010/0495; H01M 6/40; H01M 2220/30; H01M 50/172; H01M 50/531; H02J 7/022; Y02E 60/10

See application file for complete search history.

(56) References Cited

U.S. PATENT DOCUMENTS 5,567,543 A  * 10/1996 Constable .............. G03B 17/32
396/301
7,288,340 B2 * 10/2007 Iwamoto ........... H01M 10/0436
429/143

(Continued)

FOREIGN PATENT DOCUMENTS

| CN | 104396079 A | 3/2015 |
|---|---|---|
| WO | 2014/106656 A1 | 7/2014 |

*Primary Examiner* — Nicholas P D'Aniello
(74) *Attorney, Agent, or Firm* — Seed IP Law Group LLP (57) ABSTRACT

The disclosure relates to microbattery devices and assemblies. In an embodiment, a device includes a plurality of microbatteries, a first flexible encapsulation film, and a second flexible encapsulation film. Each of the microbatteries includes a first contact terminal and a second contact terminal spaced apart from one another. The first flexible encapsulation film includes a first conductive layer electrically coupled to the first contact terminal of each of the microbatteries, and a first insulating layer on the first conductive layer. The second flexible encapsulation film includes a second conductive layer electrically coupled to the second contact terminal of each of the microbatteries, and a second insulating layer on the second conductive layer.

20 Claims, 4 Drawing Sheets

(51) Int. Cl.
*H01M 10/42* (2006.01)
*H01M 10/44* (2006.01)
*H01M 50/10* (2021.01)
*H01M 50/116* (2021.01)
*H01M 50/124* (2021.01)
*H01M 50/502* (2021.01)
*H01M 6/40* (2006.01)

(52) U.S. Cl.
CPC .............................. *H01M 2220/30* (2013.01); *H01M 2300/0065* (2013.01)

(56) References Cited

U.S. PATENT DOCUMENTS

| | | | |
|---|---|---|---|
| 2004/0081860 A1* | 4/2004 | Hundt | H01M 6/40 |
| | | | 429/7 |
| 2011/0183183 A1* | 7/2011 | Grady | H01M 10/0585 |
| | | | 429/152 |
| 2013/0000110 A1 | 1/2013 | Takeda et al. | |
| 2014/0117928 A1* | 5/2014 | Liao | H02J 50/10 |
| | | | 320/108 |
| 2016/0372718 A1 | 12/2016 | Keates | |
| 2017/0018810 A1* | 1/2017 | Ladroue | H01M 4/0407 |
| 2017/0040582 A1 | 2/2017 | Kim | |

* cited by examiner

MICROBATTERY ASSEMBLY

BACKGROUND

Technical Field

The present application relates to the field of thin-film batteries or microbatteries, and more particularly to an assembly comprising a plurality of interconnected microbatteries.

Description of the Related Art

Terms thin-film battery or microbattery are conventionally used to designate a device comprising a support substrate and, on a surface of the substrate, a stack of layers forming an active battery element, the stack particularly comprising a solid electrolyte layer between a negative electrode (anode) and a positive electrode (cathode). The total thickness of a thin-film battery is typically in the range from a few tens to a few hundreds of µm, for a surface area in the range from a few mm$^2$ to a few cm$^2$, which enables to house the battery in very small spaces and further enables to manufacture more or less flexible batteries (according to the characteristics of the support substrate).

Conventionally, to increase the capacity and/or the voltage level available for an application, it is provided to connect a plurality of microbatteries in parallel and/or in series.

BRIEF SUMMARY

In an embodiment, the present disclosure provides a device including a plurality of microbatteries each having a first contact terminal and a second contact terminal spaced apart from one another A first flexible encapsulation film includes a first conductive layer electrically coupled to the first contact terminal of each of the microbatteries, and a first insulating layer on the first conductive layer. A second flexible encapsulation film includes a second conductive layer electrically coupled to the second contact terminal of each of the microbatteries, and a second insulating layer on the second conductive layer.

According to an embodiment:
the first film comprises an adhesive layer on the side of the surface of its conductive layer opposite to its insulating layer;
the second film comprises an adhesive layer arranged on the side of the surface of its conductive layer opposite to its insulating layer; and
each microbattery is located in a cavity partly formed in the adhesive layer of the first film and partly formed in the adhesive layer of the second film.

According to an embodiment, at the periphery of the assembly and between the microbatteries, the surface of the adhesive layer of the first film opposite to the conductive layer of the first film is in contact with the surface of the adhesive layer of the second film opposite to the conductive layer of the second film.

According to an embodiment, the adhesive layer of the first film and the adhesive layer of the second film are made of electrically-insulating materials.

According to an embodiment, the microbatteries are connected in series and/or in parallel via the conductive layers of the first and second films.

According to an embodiment, the conductive layer of the first film and the conductive layer of the second film are continuous layers, whereby the microbatteries of the assembly are connected in parallel.

According to an embodiment, the conductive layer of the first film and the conductive layer of the second film are discontinuous and each define a plurality of separate interconnection regions such that microbatteries of the assembly are series-connected.

According to an embodiment, the conductive layer of the first film and the conductive layer of the second film are made of aluminum, and the insulating layer of the first film and the insulating layer of the second film are made of poly(ethylene terephthalate).

According to an embodiment, the microbatteries are arranged in a bar.

According to an embodiment, the assembly is coiled on itself so that the microbatteries are stacked on one another.

According to an embodiment, the microbatteries are arranged in an array.

Another embodiment provides a device comprising:
the assembly defined above; and
a third flexible film comprising a conductive layer and an insulating layer, coating a surface of the first film opposite to the microbatteries,
wherein the conductive layer of the third film is etched to define an inductance.

According to an embodiment, the device further comprises an electronic circuit of conversion of an AC signal into a DC signal, the electronic circuit forming with the inductance a circuit for recharging, by inductive coupling, the micro-batteries of the assembly.

Another embodiment provides a method of manufacturing the assembly defined above, comprising the steps of:
etching, in the adhesive layer of the second film, a plurality of first cavities intended to each receive a microbattery;
positioning, in each first cavity, a microbattery so that the second contact terminal of the microbattery is in contact with the conductive layer of the second film at the bottom of the cavity;
etching, in the adhesive layer of the first film, a plurality of second cavities intended to each receive a microbattery; and
transferring the first film onto the second film, with its adhesive layer facing the adhesive layer of the second film, to position each microbattery in a second cavity and so that each microbattery has its first contact terminal in contact with the conductive layer of the first film at the bottom of the second cavity.

BRIEF DESCRIPTION OF THE SEVERAL VIEWS OF THE DRAWINGS

The foregoing and other features and advantages will be discussed in detail in the following non-limiting description of specific embodiments in connection with the accompanying drawings, among which.

DETAILED DESCRIPTION

The same elements have been designated with the same reference numerals in the various drawings and, further, the various drawings are not to scale. For clarity, only those steps and elements which are useful to the understanding of the described embodiments have been shown and are detailed. In particular, the compositions of the different active layers making up the microbatteries of the described assemblies have not been detailed, the described embodiments being compatible with all or most known active microbattery stacks. Further, the various uses that may be made of the described microbattery assemblies have not been detailed. In the following description, when reference is made to terms qualifying absolute positions, such as terms "front", "rear", "top", "bottom", "left", "right", etc., or relative positions, such as terms "above", "under", "upper", "lower", etc., or to terms qualifying directions, such as terms "horizontal", "vertical", etc., it is referred to the orientation of the drawings, it being understood that, in practice, the described devices may have a different orientation. Unless otherwise specified, expressions "approximately", "substantially", and "in the order of" mean to within 10%, preferably to within 5%.

Figure 1A:
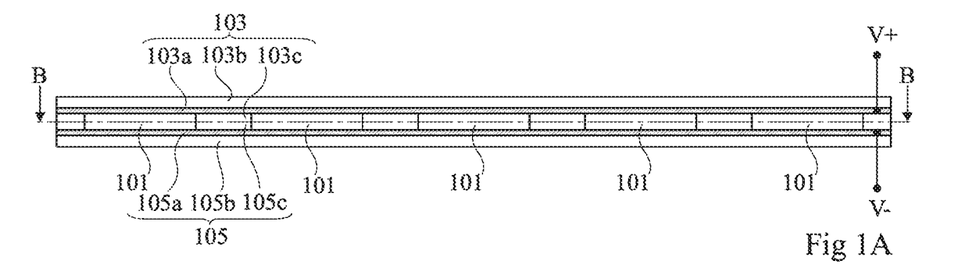
FIGS. 1A and 1B are cross-section views schematically illustrating an example of an assembly of interconnected microbatteries according to an embodiment.
Figure 1B:
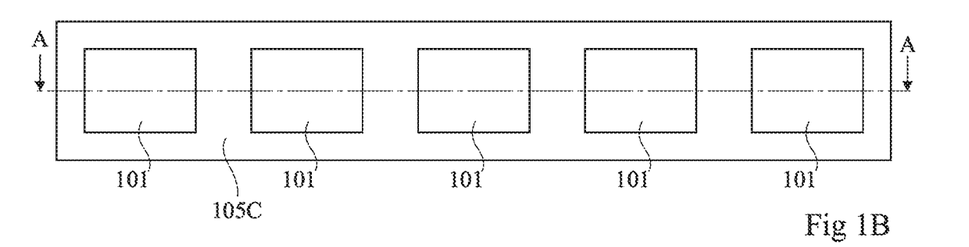

FIGS. 1A and 1B are cross-section views schematically illustrating an example of an assembly of microbatteries according to an embodiment. FIG. 1A is a cross-section view along plane A-A of FIG. 1B, and FIG. 1B is a cross-section view along plane B-B of FIG. 1A. In the following description of the assembly of FIGS. 1A and 1B, the position and orientation qualifiers are defined referring to the orientation of FIG. 1A.

The assembly of FIGS. 1A and 1B comprises five elementary microbatteries 101, for example, identical or similar, arranged in a bar, that is, arranged, in top view, in an array of one row and five columns.

Each microbattery 101 comprises a stack (not detailed in FIGS. 1A and 1B) of active layers, having as an upper layer a conductive layer forming a contact terminal of a first polarity of the microbattery, and having as a lower layer a conductive layer forming a contact terminal of opposite polarity of the microbattery. In the shown example, the upper contact terminal of each microbattery 101 is of positive polarity, and the lower contact terminal of each microbattery 101 is of negative polarity.

The assembly of FIGS. 1A and 1B comprises, on its upper surface side, a first flexible encapsulation film 103, covering microbatteries 101. Film 103 comprises a conductive layer 103a, for example, made of aluminum, coated, on its upper surface side, that is, on the side of its surface opposite to microbatteries 101, with an electrically-insulating layer 103b, for example, made of poly(ethylene) terephthalate or PET. In the shown example, film 103 further comprises an adhesive layer 103c made of an electrically-insulating material, for example, an adhesive polymer, coating the surface of conductive layer 103a opposite to insulating layer 103b.

Upper encapsulation film 103 is arranged so that each microbattery 101 has its upper contact terminal in contact with the lower surface of conductive layer 103a of film 103. For this purpose, adhesive layer 103c of film 103 is interrupted opposite each microbattery 101, to allow an access to the lower surface of conductive layer 103a.

The assembly of FIGS. 1A and 1B further comprises, on its lower surface side, a second flexible encapsulation film 105, for example, of same nature as film 103. Film 105 comprises a conductive layer 105a, for example, made of aluminum, coated, on its lower surface side, that is, on the side of its surface opposite to microbatteries 101, with an electrically-insulating layer 105b, for example, made of PET. In the shown example, film 105 further comprises an adhesive layer 105c made of an electrically-insulating material, for example, an adhesive polymer, coating the surface of conductive layer 105a opposite to insulating layer 105b.

Lower encapsulation film 105 is arranged so that each microbattery 101 has its lower contact terminal in contact with the upper surface of conductive layer 105a of film 105. For this purpose, adhesive layer 105c of film 105 is interrupted opposite each microbattery 101, to allow an access to the upper surface of conductive layer 105a of film 105.

In this example, insulating layers 103b of film 103 and 105b of film 105 are continuous layers each extending over substantially the entire surface of the assembly. The lower surface of adhesive layer 103c of film 103 is for example in contact with the upper surface of adhesive layer 105c of film 105 over the entire periphery of the assembly, as well as in the intervals separating microbatteries 101 from one another. This enables to ensure the tightness and the good mechanical resistance of the encapsulation.

In the example of FIGS. 1A and 1B, conductive layers 103a of film 103 and 105a of film 105 are continuous layers each extending over substantially the entire surface of the assembly. Thus, the elementary microbatteries 101 of the assembly are connected in parallel by conductive layer 103a on the one hand (for the positive contact terminals) and by conductive layer 105a on the other hand (for the negative contact terminals). As an example, conductive layers 103a and 105a are respectively connected to a positive contact terminal V+ and to a negative contact terminal V− of the assembly. To achieve this, insulating layer 103b of film 103 and insulating layer 105b of film 105 may be locally removed, for example, from a peripheral area of the assembly, to enable to take an electric contact respectively on the upper surface of layer 103a and on the lower surface of layer 105a.

The assembly of interconnected microbatteries described in relation with FIGS. 1A and 1B has the advantage of being relatively thin and flexible and of being capable of being shaped in a large number of positions, for example, according to the parameters of the application.

Figure 2:
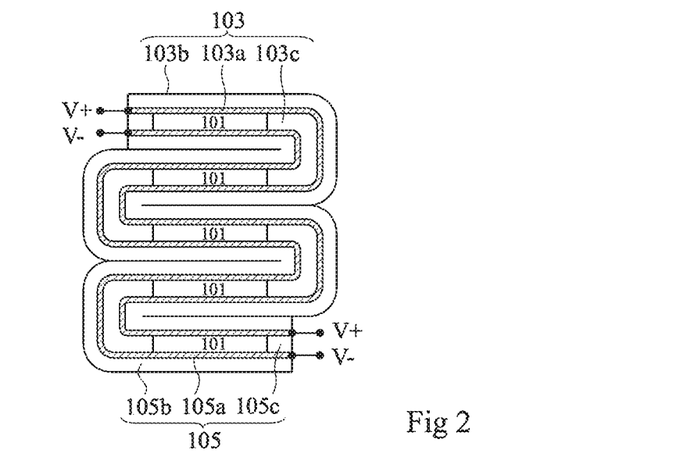
FIG. 2 is a cross-section view schematically illustrating an example of layout of an assembly of interconnected microbatteries according to an embodiment.

FIG. 2 is a cross-section view schematically illustrating an advantageous example of layout of a microbattery assembly of the type described in relation with FIGS. 1A and 1B. In the example of FIG. 2, the assembly is coiled on itself to stack the microbatteries on one another and thus minimize the surface area taken up by the assembly.

Figure 3:
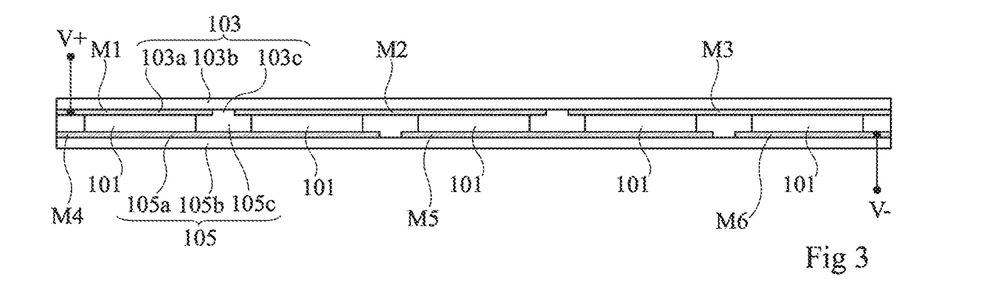
FIG. 3 is a cross-section view schematically illustrating another example of an assembly of interconnected microbatteries according to an embodiment.

FIG. 3 is a cross-section view, in the same orientation as FIG. 1A, schematically illustrating another example of an assembly of microbatteries according to an embodiment.

The assembly of FIG. 3 differs from the assembly of FIGS. 1A and 1B in that, in the example of FIG. 3, elementary microbatteries 101 are connected in series instead of being connected in parallel.

For this purpose, the assembly of FIG. 3 differs from the assembly of FIGS. 1A and 1B mainly in that, in the example of FIG. 3, conductive layers 103a and 105a are not continuous layers but are interrupted to each define a plurality of separate interconnection regions.

More particularly, in the example of FIG. 3, conductive layer 103a comprises an interconnection region M1 only in contact with the upper terminal of a first one of the five microbatteries 101 of the bar, an interconnection region M2 in contact with the upper terminals of second and third micro-batteries 101 of the bar, and an interconnection region M3 in contact with the upper terminals of fourth and fifth micro-batteries 101 of the bar. Further, in this example, conductive layer 105a comprises an interconnection region M4 in contact with the lower terminals of the first and second microbatteries 101, an interconnection region M5 in contact with the lower terminals of the third and fourth microbatteries 101, and an interconnection region M6 only in contact with the lower terminal of the fifth microbattery 101. In this example, first, second, third, fourth and fifth microbatteries 101 are disposed alternatively with their positive terminal facing upwards, that is connected to conductive layer 103a (for the first, third and fifth microbatteries), and with their positive terminal facing downwards, that is connected to conductive layer 105a (for the second and fourth microbatteries). In this example, positive and negative terminals V+ and V− of the assembly are respectively defined by interconnection region M1 and by interconnection region M6.

Similarly to what has been described in relation with FIG. 2, the assembly of FIG. 3 may be coiled by stacking of the microbatteries to minimize the surface area taken up by the assembly.

More generally, the flexible assemblies described in relation with FIGS. 1A, 1B, and 3 may be shaped in any other layout, which may be designed according to the parameters of the application in which the flexible assemblies are utilized.

Of course, the number of microbatteries of a flexible assembly of the above-described type may be different from 5. Further, the microbatteries of the assembly may be arranged otherwise than in a bar, for example, in an array or according to any other layout adapted to the parameters of the application. Further, the microbatteries of the assembly are not necessarily all connected in parallel or all connected in series. As a variation, the interconnection scheme of the microbatteries of the assembly may comprise a series association of a plurality of sub-assemblies of microbatteries connected in parallel or a parallel association of a plurality of sub-assemblies of series-connected microbatteries. Further, in the example of FIG. 1B, microbatteries 101 have, in top view, a rectangular shape. The described embodiments are however not limited to this specific case. More generally, the microbatteries may have any other shape adapted to the parameters of the application.

FIGS. 4A, 4B, 4C, 4D, 4E, 4F, 4G, 4H, and 4I are cross-section views illustrating successive steps of an example of a method of manufacturing an assembly of interconnected microbatteries of the above-described type.

Figure 4A:
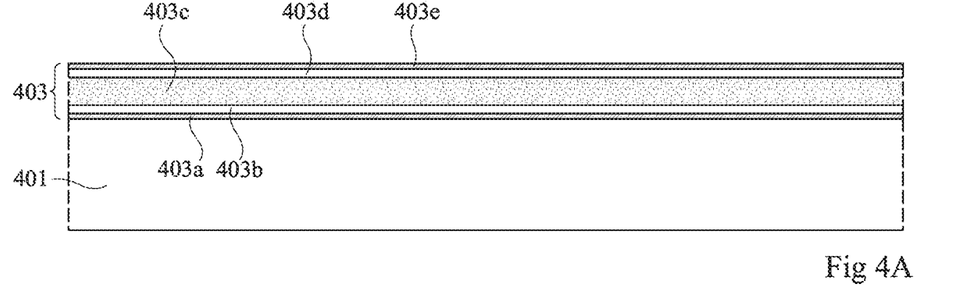
FIGS. 4A, 4B, 4C, 4D, 4E, 4F, 4G, 4H, and 4I are cross-section views illustrating successive steps of an example of a method of manufacturing an assembly of interconnected microbatteries according to an embodiment.

FIG. 4A illustrates a step during which a plurality of active microbattery layers are successively deposited on the upper surface of a temporary support substrate 401, to form an active microbattery stack 403 having the microbatteries of the assembly subsequently delimited therein. Substrate 401 is for example a glass, mica, silicon, or ceramic material substrate, for example, zirconium oxide. At the end of this step, each of the layers of stack 403 continuously extends over the entire surface of support substrate 401, which makes the deposition of stack 403 relatively simple to implement (no masking or local etching necessary on deposition of the different layers of the stack). In the shown example, stack 403 comprises, in the following order from the upper surface of the substrate, a metal layer 403a, for example, made of copper, forming a positive contact terminal, a cathode layer, 403b, for example, made of lithium cobalt dioxide ($LiCoO_2$), an electrolyte layer 403c, for example, made of lithium phosphorus oxynitride (LiPON), an anode layer 403d, for example, made of lithium, and a metal layer 403e, for example, made of copper, forming a negative contact terminal. In this example, layer 403a is deposited on top of and in contact with the upper surface of substrate 401, layer 403b is deposited on top of and in contact with the upper surface of layer 403a, layer 403c is deposited on top of and in contact with the upper surface of layer 403b, layer 403d is deposited on top of and in contact with the upper surface of layer 403c, and layer 403e is deposited on top of and in contact with the upper surface of layer 403d. Layers 403a, 403b, 403c, 403d, and 403e are for example deposited by physical vapor deposition (PVD). As an example, the total thickness of stack 403 is in the range from 20 to 80 µm, for example, in the order of 40 µm.

Figure 4B:
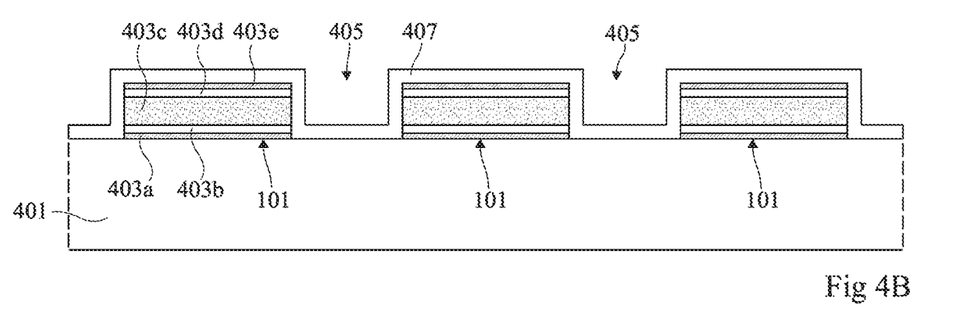

FIG. 4B illustrates a step of singularization of microbatteries 101. To achieve this, trenches 405 separating microbatteries 101 from one another are etched from the upper surface of stack 403. Trenches 405 extend vertically across the entire thickness of the stack, down to the upper surface of substrate 401. In top view, trenches 405 form, around each microbattery 101, a closed contour defining the shape of the microbattery. As an example, trenches 405 are for example formed by laser etching, for example, by means of a laser of Nd:YAG type. The use of a laser etching particularly has the advantage of providing a greater freedom as to the shape to be given to the microbatteries.

FIG. 4B further illustrates a step of depositing a passivation layer 407, for example, made of LiPON, on the upper surface of the structure obtained at the end of the step of etching singularization trenches 405. Layer 407 continuously extends over the upper surface of microbatteries 101 as well as on the sides of microbatteries 101 and on the upper surface of substrate 401 at the bottom of trenches 405. Passivation layer 407 may be deposited by any adapted conformal deposition method, for example, by physical vapor deposition (PVD).

Figure 4C:
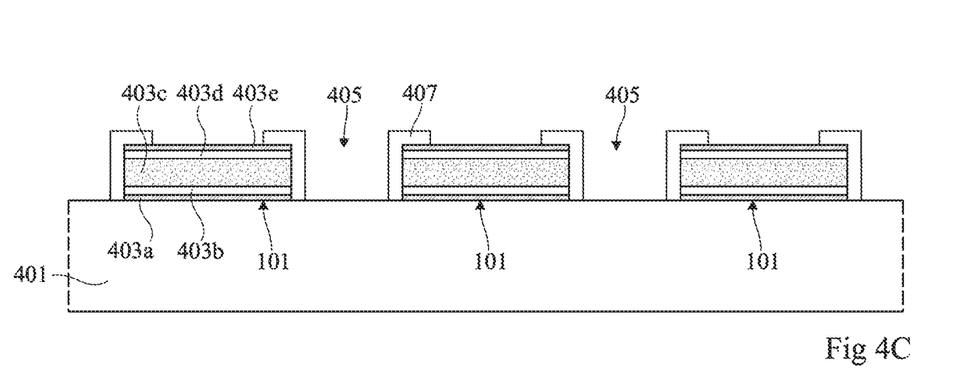

FIG. 4C illustrates a step of local etching of passivation layer 407. During this step, passivation layer 407 is removed from the bottom of trenches 405 to separate again microbatteries 101 from one another. Further, passivation layer 407 is removed from the upper surface of each microbattery 101 to enable to take an electric contact on the upper surface of the upper metal layer 403e of each microbattery. Passivation layer 407 is however kept on the lateral walls of trenches 405 to ensure the insulation of the microbattery sides. As an example, the local removal of passivation layer 407 is performed by laser etching, for example, by means of a laser of Nd:YAG type.

Figure 4D:
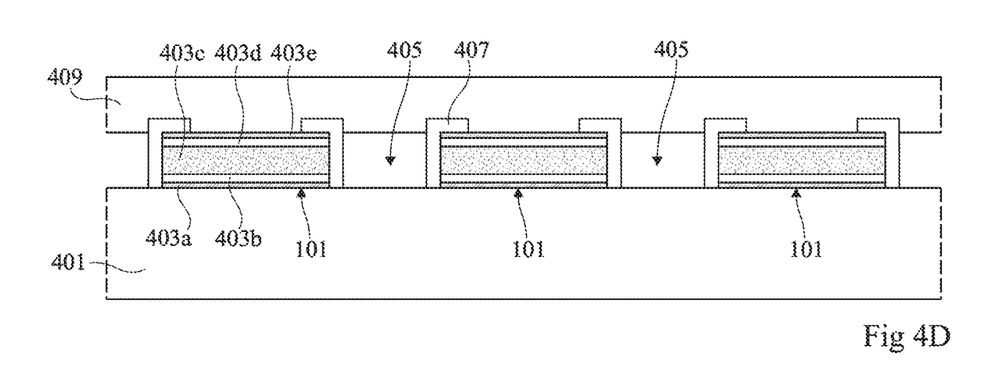

FIG. 4D illustrates a step during which a film 409, for example, a resilient film, is pasted on the upper surface of the structure obtained at the end of the steps of FIGS. 4A, 4B, and 4C. Film 409 is for example a self-adhesive film having its adhesive surface arranged in contact with the upper surfaces of microbatteries 101. Film 409 is assembled on a support, not shown, and has the function of holding the microbatteries by their upper surfaces during a subsequent step of removing support substrate 401.

Figure 4E:
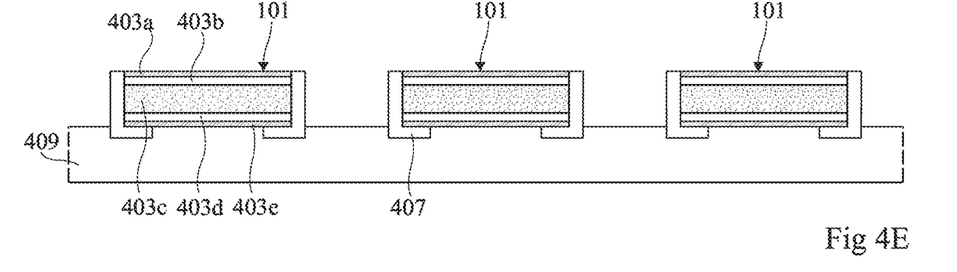

FIG. 4E illustrates a step subsequent to the installing of film 409, during which, at the level of each microbattery 101, the lower surface (in the orientation of FIG. 4D) of microbattery 101 is separated from the upper surface (in the orientation of FIG. 4D) of support substrate 401 by means of a laser beam projected through substrate 401 from its surface opposite to the microbatteries. The laser wavelength may be selected so that, at this wavelength, substrate 401 is substantially transparent and metal layer 403a is opaque or reflective. Thus, by reaching layer 403a, the laser creates a shock wave resulting in breaking the connections between the substrate and layer 403a. Substrate 401 is then removed, the microbatteries remaining glued to film 409 by their upper surfaces (in the orientation of FIG. 4D). The film may then be flipped, as illustrated in FIG. 4E, so that the adhesive surface of film 409 and microbatteries 101 face upwards.

Figure 4F:
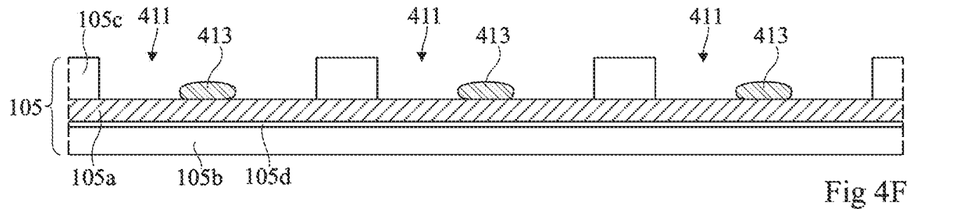

FIG. 4F illustrates a step of preparation of flexible lower encapsulation film 105 of the assembly.

Film 105 comprises a conductive layer 105a, for example, made of aluminum, coated, on its lower surface side (in the orientation of FIG. 4F), by an electrically-insulating layer 105b, for example, made of PET. In the shown example, film 105 further comprises an adhesive layer 105c made of an electrically-insulating material, for example, an adhesive polymer, coating the upper surface of conductive layer 105a. Further, in this example, an intermediate adhesive layer 105d forms an interface between conductive layer 105a and insulating layer 105b. In this example, intermediate adhesive layer 105d is in contact with the upper surface of insulating layer 105b, conductive layer 105a is in contact with the upper surface of intermediate adhesive layer 105d, and adhesive layer 105c is in contact with the upper surface of conductive layer 105a. As an example, conductive layer 105a has a thickness in the range from 10 to 40 µm, for example, in the order of 25 µm, insulating layer 105b has a thickness in the range from 10 to 40 µm, for example, in the order of 23 µm, intermediate adhesive layer 105d has a thickness in the range from 1 to 5 µm, for example, in the order of 2 µm, and upper adhesive layer 105c has a thickness in the range from 10 to 40 µm, for example, in the order of 25 µm.

FIG. 4F more particularly illustrates a step of local removal of adhesive layer 105c of film 105, to define in this layer cavities 411 intended to receive microbatteries 101 of the assembly. In this example, each cavity 411 is intended to receive a single microbattery 101. At the level of each cavity 411, layer 105c is removed across its entire thickness to free the access to the upper surface of conductive layer 105a, to allow the subsequent connection, to conductive layer 105a, of a microbattery 101 housed in cavity 411. Cavities 411 are for example formed by laser etching, for example, by means of a $CO_2$-type laser. During this step, and although this has not been shown in the drawings, a local removal of conductive layer 105a, for example, by laser etching, may further be provided, to define in layer 105a a plurality of separate interconnection regions (for example, regions M4, M5, and M6 of the example of FIG. 3). Further, a local removal of insulating layer 105b and, in some embodiments, of adhesive layer 105d, for example, by laser etching, may be provided to enable to subsequently take an electric contact on the surface of conductive layer 105a opposite to microbatteries 101.

FIG. 4F further illustrates a step of depositing, in each cavity 411, on top of and in contact with the upper surface of conductive layer 105a, a drop 413 of an electrically-conductive bonding material, for example, a conductive glue, solder paste, silver lacquer, etc.

Figure 4G:
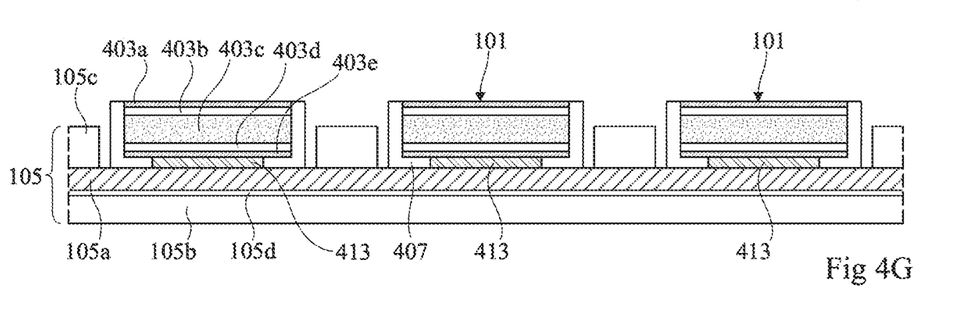

FIG. 4G illustrates a step during which micro-batteries 101 are sampled from support film 409, for example, by means of a "pick and place"-type tool, and arranged in the cavities 411 previously formed in adhesive layer 105c of encapsulation film 105, with their lower surfaces (in the orientation of FIG. 4E) facing the bottom of cavities 411. Each micro-battery 101 thus has its conductive layer 403e in electric contact, via material 413, with the conductive layer 105a of encapsulation film 105.

Figure 4H:
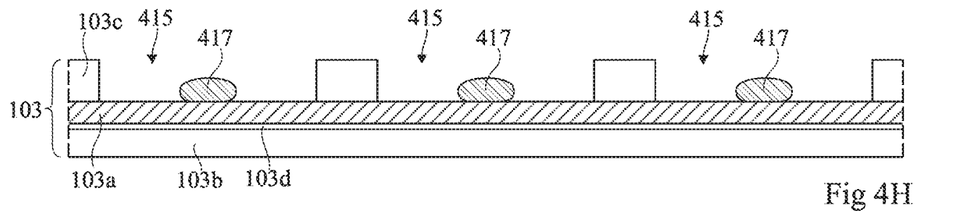

FIG. 4H illustrates a step of preparation of upper encapsulation film 103 of the assembly, similar to the step of preparing film 105 described in relation with FIG. 4F.

In this example, encapsulation film 103 is identical or similar to encapsulation film 105, that is, it comprises a stack comprising an insulating layer 103b, identical or similar to layer 105b, an intermediate adhesive layer 103d, identical or similar to layer 105d, arranged on top of and in contact with the surface of layer 103b, a conductive layer 103a, identical or similar to layer 105a, arranged on top of and in contact with the surface of layer 103d opposite to layer 103b, and an adhesive layer 103c, identical or similar to layer 105c, arranged on top of and in contact with the surface of conductive layer 103a opposite to layer 103d.

FIG. 4H more particularly illustrates a step of local removal of adhesive layer 103c of film 103, to define in this layer cavities 415 intended to receive microbatteries 101 of the assembly. In this example, each cavity 415 is intended to receive a single microbattery 101. At the level of each cavity 415, layer 103c is removed across its entire thickness to free the access to the surface of conductive layer 103a opposite to layer 103b. Cavities 415 may be formed in the same way as cavities 411 of the step of FIG. 4F, for example, by laser etching. During this step, and although this has not been shown in the drawings, a local removal of conductive layer 103a, for example, by laser etching, may further be provided, to define in layer 103a a plurality of separate interconnection regions (for example, regions M1, M2, and M3 of the example of FIG. 3). Further, a local removal of insulating layer 103b and, in some embodiments, of adhesive layer 103d, for example, by laser etching, may be provided to enable to subsequently take an electric contact on the surface of conductive layer 103a opposite to microbatteries 101.

FIG. 4H further illustrates a step of depositing, in each cavity 415, on top of and in contact with the surface of conductive layer 103a opposite to insulating layer 103b, a drop 417 of an electrically-conductive bonding material, for example, identical or similar to material 413.

Figure 4I:
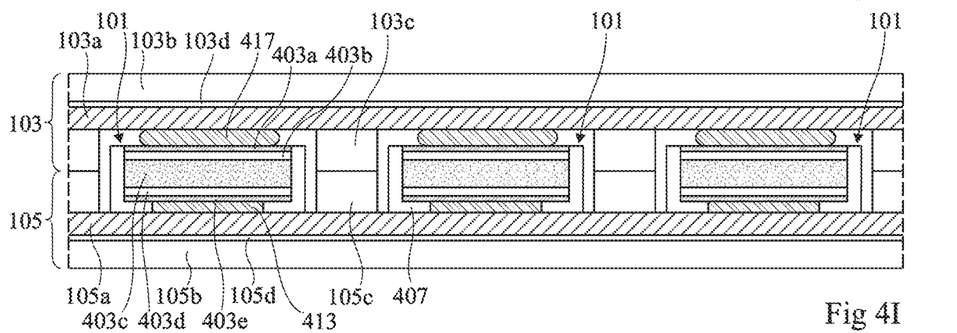

FIG. 4I illustrates a step of transfer of the upper encapsulation film 103 obtained at the end of the steps of FIG. 4H, onto the upper surface of the structure obtained at the end of the step of FIG. 4G.

During this step, upper encapsulation film 103 is arranged so that its adhesive layer 103c faces adhesive layer 105c of lower encapsulation film 105. Film 103 is aligned with respect to the structure of FIG. 4G so that each microbattery 101 of the structure of FIG. 4G is arranged opposite a cavity 415 of film 103. Upper encapsulation film 103 is for example laminated to obtain, at the periphery of the assembly and between microbatteries 101 of the assembly, a bonding between the lower surface of adhesive layer 103c of film 103 and the upper surface of adhesive layer 105c of film 105. At the end of this step, each microbattery 101 has its conductive layer 403a electrically in contact, via material 417, with conductive layer 103a of encapsulation film 103. At the end of the step of FIG. 4I, each microbattery is tightly encapsulated in a cavity laterally delimited by a ring-shaped wall made of the adhesive material of layers 103c and 105c, on the upper surface side, by the stack of layers 103a, 103d, and 103b, and, on the lower surface side, by the stack of layers 105a, 105d, and 105b.

Figure 5:
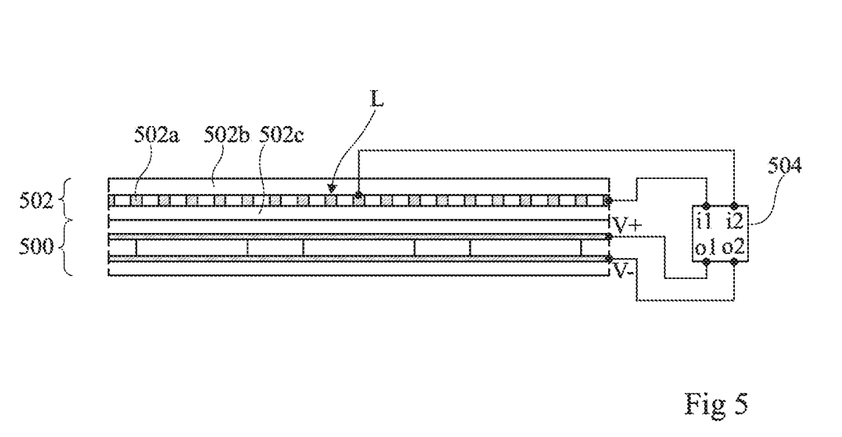
FIG. 5 is a cross-section view schematically illustrating an example of a device comprising an assembly of interconnected microbatteries according to an embodiment.

FIG. 5 is a cross-section view schematically illustrating an example of a device comprising an assembly of microbatteries according to an embodiment.

The device of FIG. 5 comprises a microbattery assembly 500 of the type described in relation with FIGS. 1A and 1B or 3. This device will not be detailed again hereafter.

The device of FIG. 5 further comprises a flexible film 502 coating a surface of device 500. Film 502 is of a same nature as flexible encapsulation film 103 and 105 of the previously-described devices, that is, it comprises a conductive layer 502a, for example, an aluminum layer, coated, on the side of a first surface, with an electrically-insulating layer 502b, for example, made of PET, and, on the side of its second surface, with an adhesive layer 502c made of an electrically-insulating material. Film 502 may further comprise an intermediate adhesive layer (not shown in FIG. 5) forming an interface between conductive layer 502a and insulating layer 502b.

In the device of FIG. 5, conductive layer 502a of film 502 has been locally etched to define an inductor L (which may be referred to herein as an inductance L) in the material of layer 502a. For example, in some embodiments, the conductive layer 502a may be etched in a spiral pattern to form the inductor L, which may operate as a receiving antenna during wireless recharging of the microbattery assembly 500. Film 502 is glued, by its adhesive layer 502c, to the insulating layer of the upper encapsulation film of assembly 500.

The device of FIG. 5 further comprises an electronic circuit 504 of conversion of an AC signal into a DC signal (e.g., the electronic circuit 504 may be an AC/DC converter). Circuit 504 comprises two input terminals i1 and i2 respectively connected to the two ends of inductance L, and two output terminals o1 and o2 respectively connected to positive terminal V+ and to negative terminal V− of microbattery assembly 500. Circuit 504 forms with inductance L a circuit for recharging, by inductive coupling, microbattery assembly 500. Advantageously, circuit 504 may be an integrated circuit housed in a cavity formed in adhesive layer 502c of film 502 and/or in the insulating layer of the upper encapsulation film of assembly 500 and/or in the adhesive layers of the upper and lower encapsulation films of assembly 500.

Specific embodiments have been described. Various alterations, modifications, and improvements will occur to those skilled in the art. In particular, the described embodiments are not limited to the examples of dimensions and of materials mentioned in the present description, nor to the examples of dimensions mentioned in the present description.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
a plurality of microbatteries, each of the microbatteries including a first metal contact terminal and a second metal contact terminal spaced apart from one another;
a first flexible encapsulation film including:
a first conductive layer electrically coupled to the first metal contact terminal of each of the microbatteries, the first conductive layer being a continuous layer that extends across and contacts the first metal contact terminal of each of the microbatteries; and
a first insulating layer on the first conductive layer; and
a first adhesive layer, the first adhesive layer being a single electrically insulating layer extending laterally between and contacting each of adjacent microbatteries of the plurality of microbatteries; and
a second flexible encapsulation film including:
a second conductive layer electrically coupled to the second metal contact terminal of each of the microbatteries; and
a second insulating layer on the second conductive layer; and
a second adhesive layer, the second adhesive layer being a single electrically insulating layer extending laterally between and contacting each of adjacent microbatteries of the plurality of microbatteries.

2. The device of claim 1, wherein:
the first conductive layer is positioned between the first adhesive layer and the first insulating layer;
the second conductive layer is positioned between the second adhesive layer and the second insulating layer; and
each microbattery is located in a respective cavity in the first adhesive layer of the first flexible encapsulation film and the second adhesive layer of the second flexible encapsulation film.

3. The device of claim 2, wherein the first adhesive layer of the first film contacts the second adhesive layer of the second film between adjacent ones of the plurality of microbatteries.

4. The device of claim 1, wherein the microbatteries are electrically coupled to one another in series or in parallel via the first and the second conductive layers.

5. The device of claim 4, wherein the first conductive layer and the second conductive layer are continuous layers, and the microbatteries are electrically coupled to one another in parallel.

6. The device of claim 1, wherein each of the first conductive layer and the second conductive layer includes aluminum, and wherein each of the first insulating layer and the second insulating layer includes poly(ethylene terephthalate).

7. The device of claim 1, wherein the microbatteries are arranged in a bar.

8. The device of claim 7, wherein the bar is coiled on itself and the microbatteries are stacked on one another.

9. The device of claim 1, wherein the microbatteries are arranged in an array.

10. A device, comprising:
a microbattery assembly, including:
a plurality of microbatteries, each of the microbatteries including a first metal contact terminal, a second metal contact terminal, and an electrolyte layer between the first and the second contact terminals;
a first flexible film having a first conductive layer, a first insulating layer on the first conductive layer, and a first adhesive layer, the first conductive layer electrically coupled to the first metal contact terminal of each of the microbatteries, the first conductive layer being a continuous layer that extends across and contacts the first metal contact terminal of each of the microbatteries, the first adhesive layer being a single electrically insulating layer extending laterally between and contacting each of adjacent microbatteries of the plurality of microbatteries; and a second flexible film having a second conductive layer, a second insulating layer on the second conductive layer, and a second adhesive layer, the second conductive layer electrically coupled to the second metal contact terminal of each of the microbatteries, the second adhesive layer being a single electrically insulating layer extending laterally between and contacting each of the adjacent microbatteries of the plurality of microbatteries; and a third flexible film on the first flexible film, the third flexible film having a third conductive layer and a third insulating layer on the third conductive layer, wherein the third conductive layer forms an inductor.

11. The device of claim 10, further comprising an AC/DC converter, the AC/DC converter including:
first and second input terminals coupled to respective terminals of the inductor; and
first and second output terminals respectively coupled to the first and second metal contact terminals of the microbatteries.

12. The device of claim 11, wherein, in use, the AC/DC converter receives an AC signal from the inductor at the first and second input terminals, and outputs a DC charging signal at the first and second metal output terminals.

13. The device of claim 10, wherein the first conductive layer and the second conductive layer are continuous layers, and the microbatteries are electrically coupled to one another in parallel.

14. The device of claim 10, wherein each of the first conductive layer and the second conductive layer includes aluminum, and wherein each of the first insulating layer and the second insulating layer includes poly(ethylene terephthalate).

15. The device of claim 10, wherein:
the first conductive layer is positioned between the first adhesive layer and the first insulating layer;
the second conductive layer is positioned between the second adhesive layer and the second insulating layer; and
each microbattery is located in a respective cavity in the first adhesive layer of the first film and the second adhesive layer of the second film.

16. A device, comprising:
a plurality of microbatteries arranged in an array, the array including at least one bar of the microbatteries arranged in a row, each of the microbatteries including a first metal contact terminal and a second metal contact terminal spaced apart from one another;
a first flexible encapsulation film including:
a first conductive layer electrically coupled to the first metal contact terminal of each of the microbatteries, the first conductive layer being a continuous layer that extends across and contacts the first metal contact terminal of each of the microbatteries; and
a first insulating layer on the first conductive layer; and
a first adhesive layer, the first adhesive layer being a single electrically insulating layer extending laterally between and contacting each of adjacent microbatteries of the plurality of microbatteries; and
a second flexible encapsulation film including:
a second conductive layer electrically coupled to the second metal contact terminal of each of the microbatteries; and
a second insulating layer on the second conductive layer; and
a second adhesive layer, the second adhesive layer being a single electrically insulating layer extending laterally between and contacting each of adjacent microbatteries of the plurality of microbatteries.

17. The device of claim 16, wherein the microbatteries are electrically coupled to one another in series via the first and second conductive layers.

18. The device of claim 16, wherein the microbatteries are electrically coupled to one another in parallel via the first and second conductive layers.

19. The device of claim 16, wherein:
the first conductive layer is positioned between the first adhesive layer and the first insulating layer;
the second conductive layer is positioned between the second adhesive layer and the second insulating layer; and
each microbattery is located in a respective cavity in the first adhesive layer of the first film and the second adhesive layer of the second film.

20. The device of claim 16, wherein each of the first conductive layer and the second conductive layer includes aluminum, and wherein each of the first insulating layer and the second insulating layer includes poly(ethylene terephthalate).

* * * * *